US012057648B2

(12) United States Patent
Aoyama et al.

(10) Patent No.: US 12,057,648 B2
(45) Date of Patent: Aug. 6, 2024

(54) FLEXIBLE PRINTED CIRCUIT BOARD WITH CONNECTION TERMINAL, AND METHOD FOR MANUFACTURING THE SAME

(71) Applicant: NIPPON MEKTRON, LTD., Tokyo (JP)

(72) Inventors: Shunsuke Aoyama, Tokyo (JP); Masanori Hirata, Tokyo (JP)

(73) Assignee: NIPPON MEKTRON, LTD., Tokyo (JP)

( * ) Notice: Subject to any disclaimer, the term of this patent is extended or adjusted under 35 U.S.C. 154(b) by 198 days.

(21) Appl. No.: 17/829,849

(22) Filed: Jun. 1, 2022

(65) Prior Publication Data

US 2023/0021344 A1 Jan. 26, 2023

(30) Foreign Application Priority Data

Jul. 26, 2021 (JP) ................................ 2021-121518

(51) Int. Cl.
*H01R 12/68* (2011.01)

(52) U.S. Cl.
CPC .................................. *H01R 12/68* (2013.01)

(58) Field of Classification Search
None
See application file for complete search history.

(56) References Cited

U.S. PATENT DOCUMENTS

2004/0102079 A1* 5/2004 Hayes .................... H01R 12/68 439/404
2016/0308256 A1 10/2016 Huang et al.
2019/0245185 A1 8/2019 Ishihara
2020/0350636 A1* 11/2020 Zhu .................. H01M 10/4257
2021/0313719 A1* 10/2021 Yamada ................ H05K 1/118

FOREIGN PATENT DOCUMENTS

EP 1035616 A1 * 9/2000 ............ H01R 12/63
JP H0529786 A * 2/1993 .............. H01R 9/07
JP 2803392 B2 * 9/1998
JP 2000022288 A * 1/2000 ............ B32B 15/08
JP 2017199808 A * 11/2017
JP 2018-018612 A 2/2018
JP 6301480 B2 3/2018

* cited by examiner

*Primary Examiner* — Krystal Robinson
(74) *Attorney, Agent, or Firm* — Studebaker & Brackett PC

(57) ABSTRACT

Provided is a flexible printed circuit board with connection terminal, including: a base film and a conductor layer provided on the base film, wherein the connection terminal includes a plurality of crimping pieces for fixing the connection terminal to the flexible printed circuit board, the crimping pieces penetrate the flexible printed circuit board by being crimped, and are bent in a direction opposite to a direction in which the crimping pieces penetrate the flexible printed circuit board, to bite into at least a part of the conductor layer, and the conductor layer is removed in a region of the conductor layer which the crimping pieces penetrate.

8 Claims, 7 Drawing Sheets

FLEXIBLE PRINTED CIRCUIT BOARD WITH CONNECTION TERMINAL, AND METHOD FOR MANUFACTURING THE SAME

CROSS-REFERENCE TO RELATED APPLICATION

This application claims priority from Japanese Patent Application No. 2021-121518 filed with the Japan Patent Office on Jul. 26, 2021, the entire content of which is hereby incorporated by reference.

BACKGROUND

1. Technical Field

The present disclosure relates to a flexible printed circuit board with connection terminal and a method for manufacturing the same.

2. Related Art

Since automobiles and the like are provided with a large number of electrical components, a large number of electrical wires are required. Wire harnesses conventionally used as electrical wires are heavy in weight and large in volume. Therefore, in recent years, the flexible printed circuit board (hereinafter, may be referred to as FPC) has been widely used. In particular, as an environmental measure, since the demand for electric vehicles, hybrid vehicles and fuel cell vehicles is increasing, the demand for the FPC is further increasing. Further, in the FPC, further weight reduction, miniaturization, improvement of flexibility, and multi-functionalization by mounting sensor parts and the like are required (see Japanese Patent No. 6301480 and JP-A-2018-18612, for example).

Therefore, connectors and connection terminals for electrically connecting the FPC and various electrical components (sensing module, ECU, battery, and the like) also tend to be miniaturized. For example, a voltage monitoring circuit board used to monitor the voltage of the battery includes the FPC and the connection terminal (may also be called a welding plate or a welding crimp) that is electrically connected to the FPC and fixed to the battery by welding. The connection terminal is fixed to the FPC by soldering in a reflow soldering process. However, when the reflow soldering process is performed, various members are heat-affected, and also the manufacturing cost of the FPC increases. Therefore, a fixing method by crimping is being studied. When a crimping method is employed, the connection terminal can be attached to the FPC simply by crimping a crimping piece. However, when the connection terminal is fixed to the FPC, the crimping piece is penetrated through a base film and the wire (conductor layer) in the FPC, and is bent to be conductive with the wire. Therefore, when the connection terminal is miniaturized and the wire is thinned, for example, there is a problem that it is difficult to maintain conductivity or strength of each member.

It is possible to increase mechanical strength by increasing thickness of the base film or a cover film, but in this case, there is a problem that the weight increases and the flexibility also decreases.

SUMMARY

A flexible printed circuit board with connection terminal, according to embodiments of the present disclosure, includes: a base film and a conductor layer provided on the base film. The connection terminal includes a plurality of crimping pieces for fixing the connection terminal to the flexible printed circuit board. The crimping pieces penetrate the flexible printed circuit board by being crimped, and are bent in a direction opposite to a direction in which the crimping pieces penetrate the flexible printed circuit board, to bite into at least a part of the conductor layer. The conductor layer is removed in a region of the conductor layer which the crimping pieces penetrate.

DETAILED DESCRIPTION

Figure 1:
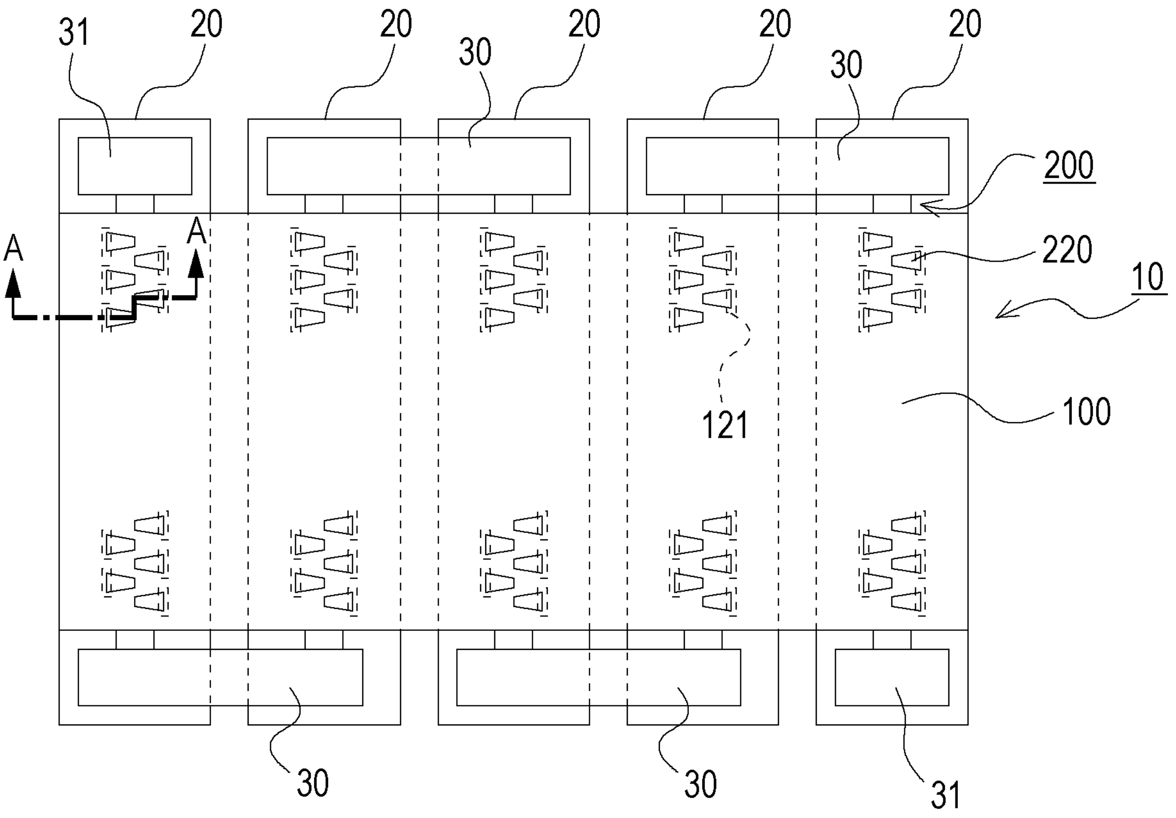
FIG. 1 is a schematic configuration diagram illustrating a state in which a flexible printed circuit board with connection terminal according to a first embodiment of the present disclosure is attached to a battery.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a flexible printed circuit board with connection terminal, which enables stable electrical connection while maintaining strength, and a method for manufacturing the same.

The present disclosure employs the following configuration.

A flexible printed circuit board with connection terminal, according to one aspect of the present disclosure, includes: a base film and a conductor layer provided on the base film. The connection terminal includes a plurality of crimping pieces for fixing the connection terminal to the flexible printed circuit board. The crimping pieces penetrate the flexible printed circuit board by being crimped, and are bent in a direction opposite to a direction in which the crimping pieces penetrate the flexible printed circuit board, to bite into at least a part of the conductor layer. The conductor layer is removed in a region of the conductor layer which the crimping pieces penetrate.

According to the present disclosure, since the connection terminal can be attached to the flexible printed circuit board by crimping, it is not affected by heat generated when the connection terminal is attached by soldering. Thus, deterioration of each member due to thermal influence can be suppressed. Further, since the conductor layer is removed in the region of the conductor layer which the crimping pieces penetrate, a load on the crimping piece can be reduced when the crimping piece penetrates the flexible printed circuit board. Thus, deformation of a tip of the crimping piece can be suppressed, a state of the crimping piece biting into the conductor layer can be stabilized, and conductivity can be increased. Along with this, it is not necessary to take measures such as increasing the number of crimping pieces or increasing a pushing amount of the crimping pieces, and it is possible to suppress a decrease in mechanical strength of each member.

It is preferable that the flexible printed circuit board further includes a cover film in a part of a region of the flexible printed circuit board, the cover film is bonded to the base film so as to sandwich the conductor layer, and at least some of the crimping pieces bite into at least a part of the conductor layer without penetrating the cover film by being arranged in a region where the cover film is not provided of the flexible printed circuit board.

Thus, a contact area between the connection terminal and the conductor layer can be increased.

It is preferable that at least some of the crimping pieces are arranged in a region where the cover film is provided of the flexible printed circuit board, and penetrates the cover film to bite into at least the part of the conductor layer.

Thus, strength of the flexible printed circuit board can be increased as compared with a case where the cover film is not provided in the entire region where the crimping pieces are arranged, and the conductor layer is exposed.

It is preferable that at least some of the crimping pieces are arranged across both the region where the cover film is provided and the region where the cover film is not provided of the flexible printed circuit board, and only a portion of the crimping piece located in the region where the cover film is provided penetrates the cover film.

Thus, it is possible to restrain the cover film from coming into contact with a crimping piece next to a crimping piece arranged at a position of penetrating the cover film and biting into a part of the conductor layer due to misalignment or the like during crimping.

It is preferable that the flexible printed circuit board further includes an insulating reinforcing film, and the insulating reinforcing film is partially provided integrally with the base film in a region of the base film which the crimping pieces penetrate.

By integrally providing the insulating reinforcing film on the base film, the strength of the flexible printed circuit board and the connection terminal can be increased in the vicinity where the crimping piece is provided. Further, since the insulating reinforcing film is partially provided, it is possible to suppress an increase in weight of the flexible printed circuit board, and also possible to suppress a decrease in flexibility of the flexible printed circuit board.

It is preferable that in a state where the connection terminal is fixed to the flexible printed circuit board by the crimping pieces, at least a part of a portion exposed from the flexible printed circuit board of the crimping pieces is covered with a resin material.

By covering with the resin material, it is possible to prevent dust and moisture on at least the part of the portion exposed from the flexible printed circuit board of the crimping pieces, and also possible to suppress physical impact and to increase insulation properties.

It is preferable that the flexible printed circuit board is a single-sided copper-clad laminate in which the base film is made of polyimide, polyethylene naphthalate, or polyethylene terephthalate.

A method for manufacturing a flexible printed circuit board with connection terminal, according to the present disclosure, includes: providing a conductor layer on a base film included in the flexible printed circuit board; removing the conductor layer in a predetermined region of the conductor layer; and fixing the connection terminal to the flexible printed circuit board by crimping a crimping piece included in the connection terminal so as to penetrate the predetermined region of the conductor layer from which the conductor layer has been removed.

As described above, according to the present disclosure, it is possible to enable stable electrical connection while maintaining strength.

Hereinafter, embodiments for carrying out the present disclosure will be described in detail exemplarily based on the embodiments with reference to the drawings. However, unless otherwise specified, dimensions, materials, shapes, relative arrangements, and the like of components described in the following embodiments do not limit the scope of the present disclosure.

First Embodiment

Figure 2:
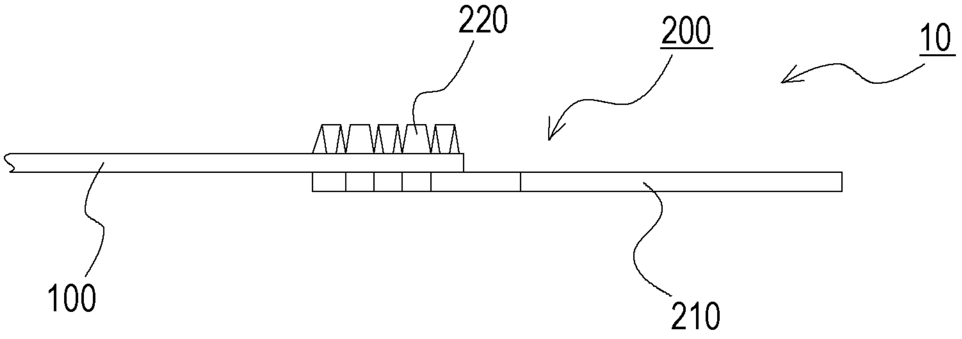
FIG. 2 is a schematic configuration diagram of the flexible printed circuit board with connection terminal according to the first embodiment of the present disclosure.
Figure 3:
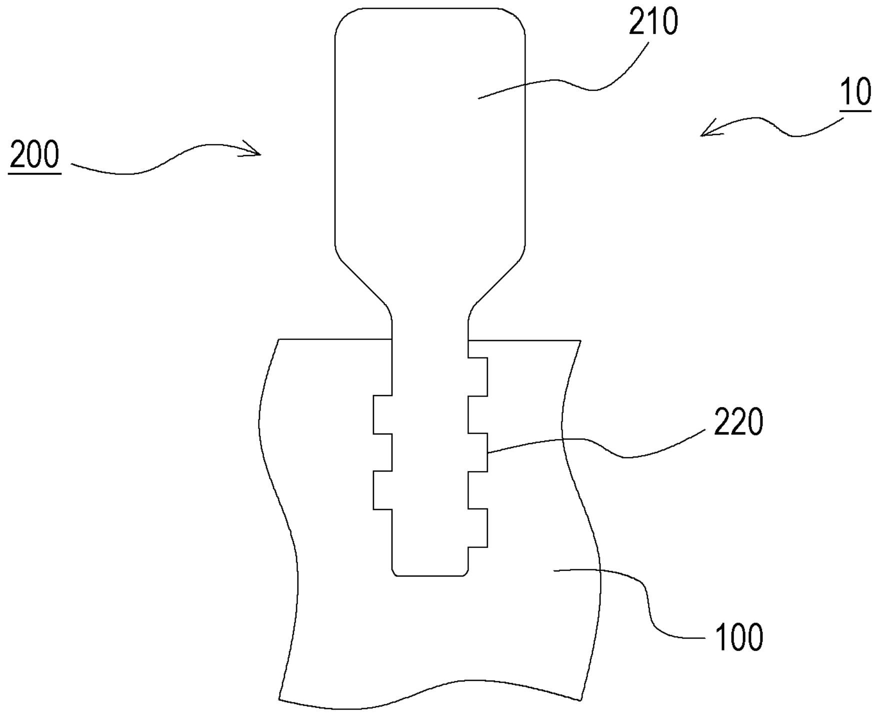
FIG. 3 is a schematic configuration diagram of the flexible printed circuit board with connection terminal according to the first embodiment of the present disclosure.
Figure 4:
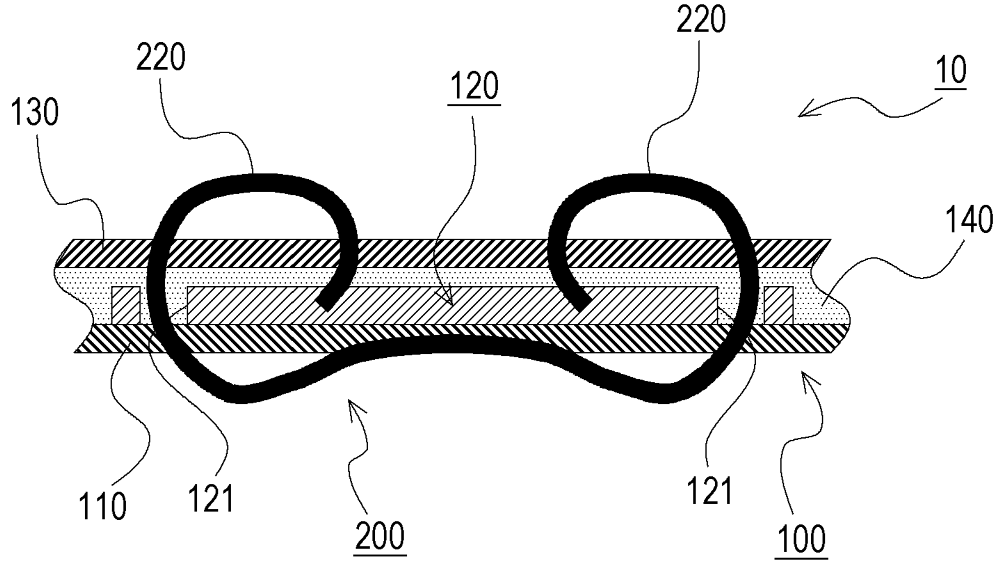
FIG. 4 is a schematic sectional view of the flexible printed circuit board with connection terminal according to the first embodiment of the present disclosure.
Figure 5A:
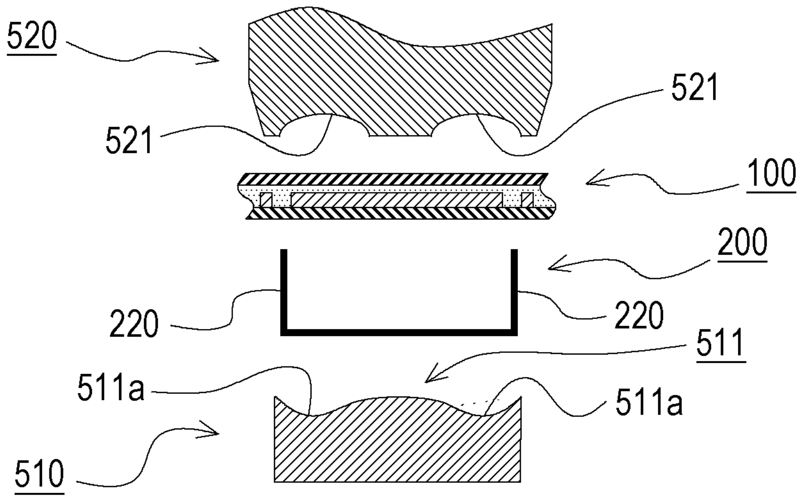
FIGS. 5A to 5C are schematic diagrams illustrating how the connection terminal according to the first embodiment of the present disclosure is crimped to the flexible printed circuit board.
Figure 5B:
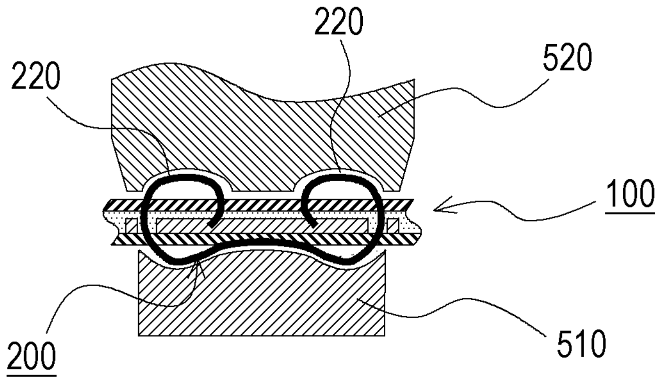
Figure 5C:
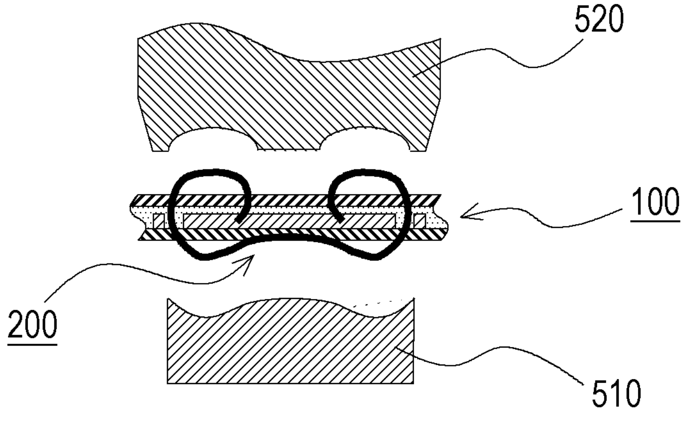

The flexible printed circuit board with connection terminal according to a first embodiment of the present disclosure will be described with reference to FIGS. 1 to 4 and 5A to 5C. FIG. 1 is a schematic configuration diagram (schematic plan view) illustrating a state in which the flexible printed circuit board with connection terminal according to the first embodiment of the present disclosure is attached to a battery. Note that in FIG. 1, in order to make it easy to understand an internal configuration, a part of the configuration is seen through (portions illustrated by dotted lines in the figure are see-through portions). FIG. 2 is a schematic configuration diagram (a part of a side view) of the flexible printed circuit board with connection terminal according to the first embodiment of the present disclosure. FIG. 3 is a schematic configuration diagram (a part of a rear view) of the flexible printed circuit board with connection terminal according to the first embodiment of the present disclosure. FIG. 4 is a schematic sectional view of the flexible printed circuit board with connection terminal according to the first embodiment of the present disclosure, and is a sectional view taken along line A-A in FIG. 1. FIGS. 5A to 5C are schematic diagrams illustrating a procedure for crimping the connection terminal to the flexible printed circuit board in the first embodiment of the present disclosure, and each member is illustrated in a schematic sectional view.

The flexible printed circuit board with connection terminal according to the present embodiment can be applied to various devices. In the following description, a case where the flexible printed circuit board with connection terminal is employed as a voltage monitoring circuit board of the battery will be described as an example.

Voltage Monitoring Circuit Board

As illustrated in FIG. 1, the battery includes a plurality of cells 20. The cells 20 are arranged so that a positive electrode and a negative electrode are adjacent to each other. Further, the cells 20 are configured such that the positive electrode and the negative electrode adjacent to each other are electrically connected by a bus bar 30 so as to be connected in series. Bus bars 31 for power distribution are also connected to the cells 20 (the leftmost and rightmost cells 20 in FIG. 1) arranged at both ends of the battery. In an example illustrated in FIG. 1, the battery including five cells 20 is illustrated for convenience of explanation, but the number of cells 20 may be appropriately set. For example, the battery mounted on an electric vehicle or the like generally includes more than five cells 20.

The voltage monitoring circuit board is installed in the battery configured as described above in order to monitor whether each cell 20 is normal. In the present embodiment, the flexible printed circuit board with connection terminal (hereinafter referred to as "FPC 10 with terminal") is installed above the battery including five cells 20 as the voltage monitoring circuit board.

Flexible Printed Circuit Board with Connection Terminal

The configuration of the FPC 10 with terminal according to the present embodiment will be described. The FPC 10 with terminal includes the flexible printed circuit board (hereinafter referred to as "FPC 100") and a connection terminal 200 attached to the FPC 100.

The FPC 100 has a base film 110, a conductor layer 120, and a cover film 130. The conductor layer 120 is provided on the base film 110 (on an upper surface of the base film 110). The cover film 130 is bonded to the base film 110 so as to sandwich the conductor layer 120. An adhesive layer 140 for bonding the base film 110 and the cover film 130 is formed therebetween. Through-holes 121 which a crimping piece 220 penetrates are formed in the conductor layer 120 (see FIG. 4). The conductor layer 120 is made of a metal foil (copper foil or the like). The base film 110 is made of polyimide, polyethylene naphthalate, or polyethylene terephthalate. In the FPC 100 configured as described above, when the conductor layer 120 is made of the copper foil, the FPC 100 is called a single-sided copper-clad laminate.

The connection terminal 200 according to the present embodiment includes a welding portion 210 and a plurality of the crimping pieces 220. The welding portion 210 is fixed to the bus bars 30 and 31 by welding. The connection terminal 200 is fixed to the FPC 100 by crimping the crimping pieces 220 to the FPC 100. The connection terminal 200 is made of a metal such as a nickel alloy, a copper alloy, or an aluminum alloy, and may also be called a welding plate or a welding crimp. Further, the crimping pieces 220 are provided on both sides in a width direction of the connection terminal 200 (in a direction perpendicular to a direction from the bus bar 30 side to the FPC 100 side) so as to be alternately arranged at predetermined intervals. Note that in the present embodiment, a configuration is illustrated in which a total of five crimping pieces 220 are provided in one connection terminal 200, but the number of crimping pieces 220 is not limited to this configuration and can be appropriately set.

The crimping piece 220 is configured to penetrate the FPC 100 by being crimped to the FPC 100, and be bent in a direction opposite to a direction in which the crimping piece 220 penetrates the FPC 100, to bite into at least a part of the conductor layer 120. In the present embodiment, the conductor layer 120 is removed in a region of the conductor layer 120 of the FPC 100 which the crimping pieces 220 penetrate. That is, by removing the conductor layer 120 in the region of the conductor layer 120 which the crimping pieces 220 penetrate, the through-holes 121 are formed in the conductor layer 120. The crimping piece 220 penetrates the FPC 100 through a region from which the conductor layer 120 has been removed. The shape of the through-hole 121 is not particularly limited, and may be, for example, a quadrangle, a circle, an ellipse, or the like in a plan view.

That is, in the present embodiment, the crimping piece 220 is configured to penetrate the through-hole 121 from the base film 110 side toward the cover film 130 side, and be bent in the direction opposite to the direction in which the crimping piece 220 penetrates the FPC 100, to bite into at least the part of the conductor layer 120.

More specifically, the tip of the crimping piece 220 in the present embodiment sequentially penetrates the base film 110, the through-hole 121 provided in the conductor layer 120, and the cover film 130, and is then bent in the direction opposite to the direction in which the crimping piece 220 penetrates the FPC 100, to penetrate the cover film 130 again and then bite into at least the part of the conductor layer 120. In the present embodiment, the connection terminal 200 is attached to the FPC 100 by crimping the crimping piece 220 in this way.

Method for Manufacturing FPC with Connection Terminal

The method for manufacturing the FPC 100 with connection terminal 200 will be described in order of manufacturing steps. First, a part of the conductor layer 120 made of a metal foil such as a copper foil provided on the surface of the base film 110 is removed by etching. In the present embodiment, a predetermined electrical circuit is formed by etching, and the conductor layer 120 in a predetermined region to be penetrated by the crimping pieces 220 is removed. By removing a part of the conductor layer 120 in a plurality of places in this way, the through-holes 121 are formed.

Next, an adhesive is applied onto an exposed base film 110 and the conductor layer 120 to form the adhesive layer

140. Next, the cover film 130 is provided on the adhesive layer 140, and the FPC 100 is obtained. Thereafter, the connection terminal 200 is attached to the FPC 100 by crimping the crimping pieces 220 provided in the connection terminal 200. At this time, the crimping pieces 220 provided in the connection terminal 200 are crimped to penetrate the region (through-hole 121) from which the conductor layer 120 has been removed.

FIGS. 5A to 5C are diagrams illustrating a procedure of crimping the connection terminal 200 to the FPC 100 in the order of steps. The connection terminal 200 is crimped to the FPC 100 by a crimping jig or a crimping device. The crimping jig or crimping device includes a first member 510 and a second member 520. The first member 510 has a support surface 511 that supports a bottom surface of the connection terminal 200. The second member 520 has a pair of bending surfaces 521 for bending the crimping piece 220. The support surface 511 of the first member 510 has a concave surfaces 511*a* on both sides in the width direction of the connection terminal 200, and is configured such that a surface between these two concave surfaces 511*a* is a convex surface. By adopting such a configuration, a distance between the tip of the crimping piece 220 and the top surface of the connection terminal 200 located on the bottom surface side of the FPC100 is reduced when the tip of the crimping piece 220 is bent by the pair of bending surfaces 521 of the second member 520 and bites into at least a part of the conductor layer 120. Therefore, the connection terminal 200 can be more stably connected to the FPC 100.

A procedure for crimping the connection terminal 200 to the FPC 100 will be described with reference to FIGS. 5A to 5C. Note that in FIGS. 5A to 5C, each member is simply illustrated in a sectional view. First, as illustrated in FIG. 5A, the connection terminal 200 is disposed below the FPC 100, the first member 510 is disposed below the connection terminal 200, and the second member 520 is disposed above the FPC 100. At this time, the crimping piece 220 of the connection terminal 200 is preferably pre-bent to have two surfaces in directions parallel to and perpendicular to the bottom surface of the connection terminal 200 (a lateral direction and an upward direction in FIG. 5A).

Next, as illustrated in FIG. 5B, the FPC 100 and the connection terminal 200 are sandwiched by the first member 510 and the second member 520. At this time, the first member 510 is moved upward and the second member 520 is moved downward relative to the FPC 100 and the connection terminal 200. Alternatively, both the first member 510 and the second member 520 may be moved, or one of the first member 510 or the second member 520 may be fixed and the other may be moved. By sandwiching the FPC 100 and the connection terminal 200 by the first member 510 and the second member 520 in this way, the crimping pieces 220 penetrate the FPC 100 through the through-hole 121, and are then bent in the direction opposite to the direction in which the crimping pieces 220 penetrate the FPC 100 by the bending surfaces 521 of the second member 520. Thus, the tip of the crimping piece 220 penetrating the FPC 100 is in a state of biting into at least a part of the conductor layer 120. Further, the portion of the crimping piece 220 in contact with the support surface 511 of the first member 510 is deformed to follow the shape of the support surface 511 (that is, the shape of the concave surface 511*a*). Thus, the FPC 100 with connection terminal 200, that is, the FPC 10 with terminal is formed.

Thereafter, as illustrated in FIG. 5C, the first member 510 and the second member 520 are moved away from the formed FPC 10 with terminal, so that the FPC 10 with terminal can be removed from the crimping jig or the like.

Advantages of Flexible Printed Circuit Board with Connection Terminal According to the Present Embodiment In the FPC 10 with terminal according to the present embodiment, since the connection terminal 200 can be attached to the FPC 100 by crimping, it is not affected by the heat generated when the connection terminal 200 is attached by soldering. Thus, deterioration of each member due to the thermal influence can be suppressed. Further, the conductor layer 120 is removed in the region of the conductor layer 120 of the FPC 100 which the crimping piece 220 of the connection terminal 200 penetrates. Therefore, at the time of crimping, when the crimping piece 220 penetrates the FPC 100, the load applied to the crimping piece 220 can be reduced. Thus, the deformation of the tip of the crimping piece 220 can be suppressed, the state of the crimping piece 220 biting into the conductor layer 120 can be stabilized, and the conductivity can be increased. Therefore, it is not necessary to take measures to increase the conductivity such as increasing the number of the crimping pieces 220 or increasing the pushing amount of the crimping pieces 220, and it is possible to suppress the decrease in the mechanical strength of each member.

Second Embodiment

Figure 6:
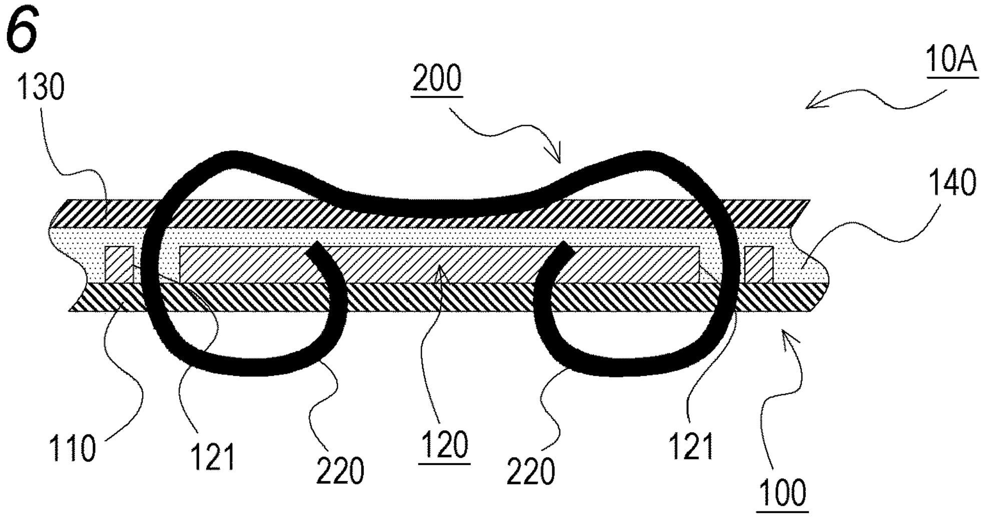
FIG. 6 is a schematic sectional view of the flexible printed circuit board with connection terminal according to a second embodiment of the present disclosure.

FIG. 6 illustrates a second embodiment of the present disclosure. In the first embodiment, the configuration has been described in which the connection terminal 200 is attached to the FPC 100 so that the crimping piece 220 penetrates the FPC 100 from the base film 110 side toward the cover film 130 side. On the other hand, in the present embodiment, a configuration will be described in which the connection terminal 200 is attached to the FPC 100 so that the crimping piece 220 penetrates the FPC 100 from the cover film 130 side toward the base film 110 side. Since the configuration of the FPC 100 itself and the configuration of the connection terminal 200 itself are the same as those in the first embodiment, the same components may be denoted by the same reference numerals and description thereof may be omitted.

FIG. 6 is a schematic sectional view of the flexible printed circuit board with connection terminal according to the second embodiment of the present disclosure. FIG. 6 simply illustrates a sectional view when the flexible printed circuit board with connection terminal is cut at the same position as the sectional view illustrated in FIG. 4 in the first embodiment.

A configuration of the flexible printed circuit board with connection terminal (hereinafter referred to as "FPC 10A with terminal") according to the present embodiment will be described. The FPC 10A with terminal includes the flexible printed circuit board (hereinafter referred to as "FPC 100") and the connection terminal 200 attached to the FPC 100. The configuration of the FPC 100 itself and the configuration of the connection terminal 200 itself are as described in the first embodiment.

In the present embodiment, the connection terminal 200 is attached to the FPC 100 so that the crimping piece 220 penetrates the FPC 100 from the cover film 130 side to the base film 110 side. Similar to the first embodiment, the conductor layer 120 is removed in the region of the conductor layer 120 of the FPC 100 which the crimping piece

220 of the connection terminal 200 penetrates. Note that the method for manufacturing the FPC 10A with terminal according to the present embodiment is the same as that of the first embodiment.

In the present embodiment, the crimping piece 220 is configured to penetrate the through-hole 121 from the cover film 130 side toward the base film 110 side, and be bent in the direction opposite to the direction in which the crimping piece 220 penetrates the FPC 100, to bite into at least the part of the conductor layer 120.

More specifically, the tip of the crimping piece 220 sequentially penetrates the cover film 130, the through-hole 121 provided in the conductor layer 120, and the base film 110, and is then bent in the direction opposite to the direction in which the crimping piece 220 penetrates the FPC 100, to penetrate the base film 110 again and then bite into at least the part of the conductor layer 120.

The same effect as that of the first embodiment can also be obtained in the FPC 10A with terminal according to the present embodiment configured as described above.

Third Embodiment

Figure 7:
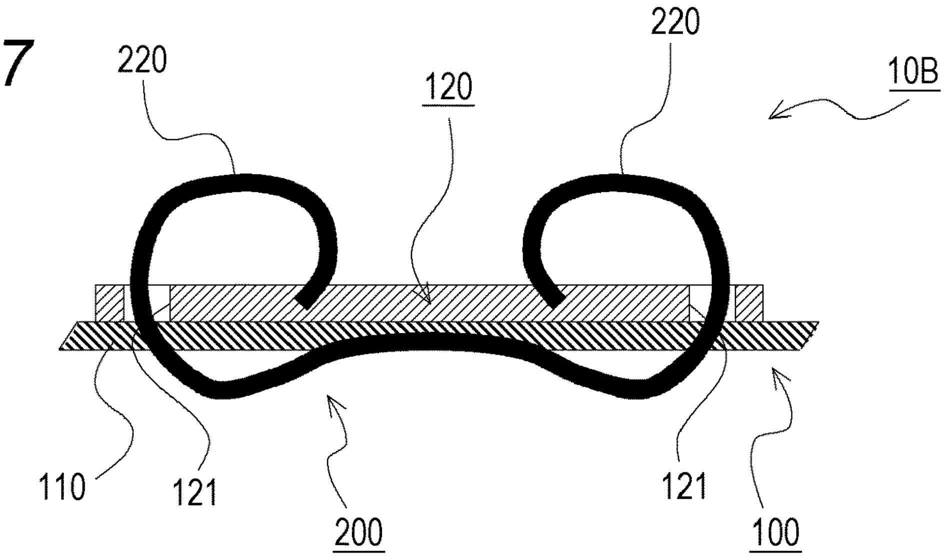
FIG. 7 is a schematic sectional view of the flexible printed circuit board with connection terminal according to a third embodiment of the present disclosure.

FIG. 7 illustrates a third embodiment of the present disclosure. In the first and second embodiments, a configuration when the FPC 100 includes the base film 110, the conductor layer 120, and the cover film 130 has been described. On the other hand, in the present embodiment, a configuration when the cover film 130 is not provided in the FPC 100 will be described. Since other basic configurations are the same as those in the first embodiment, the same components may be denoted by the same reference numerals and the description thereof may be omitted.

FIG. 7 is a schematic sectional view of the flexible printed circuit board with connection terminal according to the third embodiment of the present disclosure. FIG. 7 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10B with terminal") according to the present embodiment will be described. The FPC 10B with terminal includes the flexible printed circuit board (hereinafter referred to as "FPC 100") and the connection terminal 200 attached to the FPC 100. The configuration of the connection terminal 200 is as described in the first embodiment.

The FPC 100 has the base film 110 and the conductor layer 120 made of a metal foil (copper foil or the like) provided on the surface of the base film 110. In the FPC 100 according to the present embodiment, the entire region of the conductor layer 120 is exposed without the cover film 130 being provided. The configurations of the base film 110 and the conductor layer 120 are as described in the first embodiment. That is, also in the present embodiment, the conductor layer 120 is removed in the region of the conductor layer 120 which the crimping pieces 220 penetrate.

In the present embodiment, the crimping piece 220 is configured to penetrate the through-hole 121 from the base film 110 side toward the conductor layer 120 side, and be bent in the direction opposite to the direction in which the crimping piece 220 penetrates the FPC 100, to bite into at least the part of the conductor layer 120.

More specifically, the tip of the crimping piece 220 sequentially penetrates the base film 110, and the through-holes 121 provided in the conductor layer 120, and is then bent in the direction opposite to the direction in which the crimping piece 220 penetrates the FPC 100, to bite into at least the part of the conductor layer 120. In the present embodiment, the connection terminal 200 is attached to the FPC 100 by crimping the crimping piece 220 in this way.

The same effect as that of the first embodiment can also be obtained in the FPC 10B with terminal according to the present embodiment configured as described above. Further, in the FPC 10B with terminal, all the crimping pieces 220 are configured to bite into a part of the exposed conductor layer 120 without penetrating the cover film 130. When the crimping piece 220 penetrates the cover film 130 and bites into the part of the conductor layer 120, a part of the cover film 130 may enter the vicinity of a portion where the crimping piece 220 and the conductor layer 120 are connected, and thus a contact area between the crimping piece 220 and the conductor layer 120 may be reduced. On the other hand, by adopting a configuration in which the cover film 130 is not provided as in the present embodiment, there is no possibility that the contact area between the crimping piece 220 and the conductor layer 120 is reduced as when the cover film 130 is provided. Therefore, the electrical connection can be further stabilized. Note that the procedure for crimping the connection terminal 200 to the FPC 100 is as described in the first embodiment.

Fourth Embodiment

Figure 8:
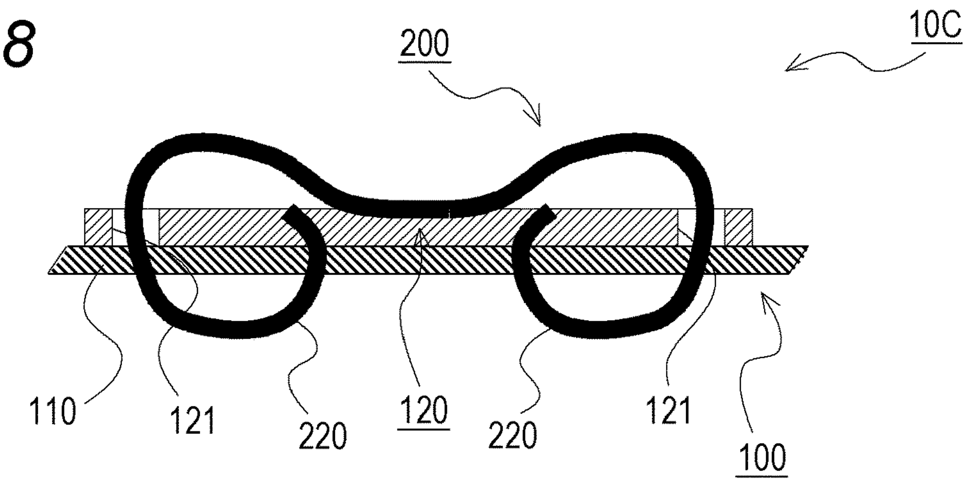
FIG. 8 is a schematic sectional view of the flexible printed circuit board with connection terminal according to a fourth embodiment of the present disclosure.

FIG. 8 illustrates a fourth embodiment of the present disclosure. In the third embodiment, the configuration has been described in which the connection terminal 200 is attached to the FPC 100 so that the crimping piece 220 penetrates the FPC 100 from the base film 110 side toward the conductor layer 120 side. On the other hand, in the present embodiment, a configuration will be described in which the connection terminal 200 is attached to the FPC 100 so that the crimping piece 220 penetrates the FPC 100 from the conductor layer 120 side toward the base film 110 side. Since the configuration of the FPC 100 itself is the same as that of the third embodiment and the configuration of the connection terminal 200 itself is the same as that of the first embodiment, the same components may be denoted by the same reference numerals and the description thereof may be omitted.

FIG. 8 is a schematic sectional view of the flexible printed circuit board provided with connection terminal according to the fourth embodiment of the present disclosure. FIG. 8 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10C with terminal") according to the present embodiment will be described. The FPC 10C with terminal includes the flexible printed circuit board (hereinafter referred to as "FPC 100") and the connection terminal 200 attached to the FPC 100. The configuration of the FPC 100 itself is as described in the third embodiment, and the configuration of the connection terminal 200 itself is as described in the first embodiment.

In the present embodiment, the crimping piece 220 is configured to penetrate the FPC 100 from the conductor layer 120 side toward the base film 110 side, and be bent in the direction opposite to the direction in which the crimping piece 220 penetrates the FPC 100, to bite into at least the part of the conductor layer 120. More specifically, the tip of the crimping piece 220 sequentially penetrates the through-hole 121 provided in the conductor layer 120, and the base film 110, and is then bent in the direction opposite to the direction in which the crimping piece 220 penetrates the FPC 100, to penetrate the base film 110 again and then bite into at least the part of the conductor layer 120. In the present embodiment, the connection terminal 200 is attached to the FPC 100 by crimping the crimping piece 220 in this way.

The same effect as that of the third embodiment can also be obtained in the FPC 10C with terminal according to the present embodiment configured as described above. Note that the procedure for crimping the connection terminal 200 to the FPC 100 is as described in the first embodiment.

Fifth Embodiment

Figure 9:
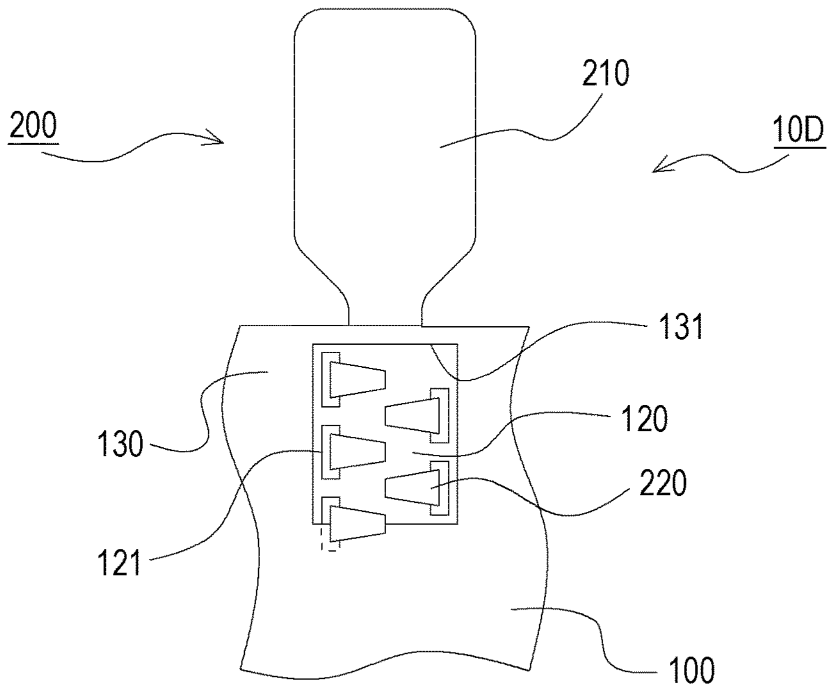
FIG. 9 is a schematic configuration diagram of the flexible printed circuit board with connection terminal according to a fifth embodiment of the present disclosure.
Figure 10:
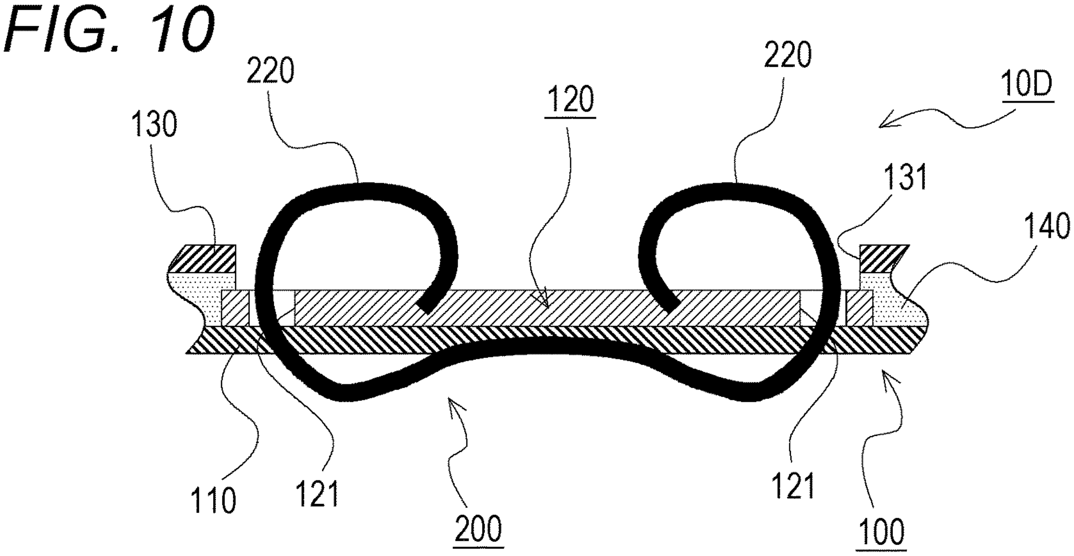
FIG. 10 is a schematic sectional view of the flexible printed circuit board with connection terminal according to the fifth embodiment of the present disclosure.

FIGS. 9 and 10 illustrate a fifth embodiment of the present disclosure. In the first and second embodiments, the configuration has been described in which the conductor layer 120 is provided on the base film 110 and the cover film 130 is provided on the entire surface of the adhesive layer 140 provided on the conductor layer 120. On the other hand, in the present embodiment, a configuration will be described in which a part of the conductor layer 120 is exposed without the cover film 130 being provided in a part of a region of the FPC 100. Since the other basic configurations are the same as those in the first embodiment, the same components may be denoted by the same reference numerals and the description thereof may be omitted.

FIG. 9 is a schematic configuration diagram (a part of a plan view) of the flexible printed circuit board with connection terminal according to the fifth embodiment of the present disclosure. FIG. 10 is a schematic sectional view of the flexible printed circuit board with connection terminal according to the fifth embodiment of the present disclosure. FIG. 10 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10D with terminal") according to the present embodiment will be described. The FPC 10D with terminal includes the flexible printed circuit board (hereinafter referred to as "FPC 100") and the connection terminal 200 attached to the FPC 100. The configuration of the connection terminal 200 is as described in the first embodiment.

The FPC 100 has the base film 110, the conductor layer 120, and the cover film 130. The conductor layer 120 is provided on the surface of the base film 110. The cover film 130 is bonded to the base film 110 so as to sandwich the conductor layer 120. The adhesive layer 140 for bonding the base film 110 and the cover film 130 is formed therebetween. In a part of a region of the FPC 100 according to the present embodiment, a part of the conductor layer 120 is exposed without the cover film 130 being provided. That is, by providing an opening 131 in a part of the cover film 130, the part of the conductor layer 120 is exposed. In the present embodiment, at least some of the crimping pieces 220 are arranged in a region where the conductor layer 120 is exposed (a region in the opening 131). Thus, the crimping piece 220 arranged in the region in the opening 131 bites into a part of the conductor layer 120 without penetrating the cover film 130. In the present embodiment, a configuration is employed in which four crimping pieces 220 out of the five crimping pieces 220 are arranged in the region in the opening 131. Then, the remaining one crimping piece 220 (bottom crimping piece 220 in FIG. 9) is configured so that only a part of the tip thereof penetrates the cover film 130. It should be noted that a configuration may be employed in which all the crimping pieces 220 are arranged in the region in the opening 131.

The configurations of the base film 110 and the conductor layer 120 are as described in the first embodiment. That is, also in the present embodiment, the through-holes 121 are formed by removing the conductor layer 120 in the region of the conductor layer 120 which the crimping pieces 220 penetrate.

In the present embodiment, as in the third embodiment, the crimping piece 220 is configured to penetrate the through-hole 121 from the base film 110 side toward the conductor layer 120 side, and be bent in the direction opposite to the direction in which the crimping piece 220 penetrates the FPC 100, to bite into at least the part of the conductor layer 120. In the present embodiment, the connection terminal 200 is attached to the FPC 100 by crimping the crimping piece 220 in this way.

The same effect as that of the first embodiment can also be obtained in the FPC 10D with terminal according to the present embodiment configured as described above. Further, as in the third embodiment, the plurality of crimping pieces 220 (four in the present embodiment) arranged in the region in the opening 131 are configured to bite into a part of the exposed conductor layer 120 without penetrating the cover film 130. Therefore, as in the third embodiment, there is no possibility that the contact area between the crimping piece 220 and the conductor layer 120 is reduced. Therefore, the electrical connection can be further stabilized.

Further, in the present embodiment, the bottom crimping piece 220 in FIG. 9 is configured such that only a part of the tip of the crimping piece 220 penetrates the cover film 130. By employing such a configuration, it is possible to restrain the cover film 130 from coming into contact with a crimping piece 220 (a second crimping piece 220 from the bottom in FIG. 9) next to the crimping piece 220 arranged at a position where it bites into a part of the conductor layer 120 in a state of penetrating the cover film 130 due to misalignment or the like during crimping. This makes it possible to further stabilize the electrical connection.

Note that in the present embodiment, a case where the four crimping pieces 220 are configured to bite into the part of the exposed conductor layer 120 without penetrating the cover film 130 has been described. However, the number of crimping pieces 220 configured to bite into the part of the exposed conductor layer 120 without penetrating the cover film 130, and the number of crimping pieces 220 configured to bite into the part of the conductor layer 120 in the state of penetrating the cover film 130 can be appropriately set. The strength of the FPC 100 is higher when the crimping piece 220 penetrates the cover film 130. On the other hand, the electrical connection is more stable when the crimping piece 220 does not penetrate the cover film 130. Therefore, in consideration of balance between the strength and stability of the electrical connection, distribution of the crimping pieces 220 arranged in the region where the conductor layer 120 is exposed and the crimping pieces 220 arranged in a region where the cover film 130 is provided, that is, the number of crimping pieces 220 in each region is preferably set according to a usage environment and the like. Further, for example, as in the crimping piece 220 at the bottom of FIG. 9, the crimping piece 220 may be arranged, at a boundary between the region where the conductor layer 120 is exposed and the region where the cover film 130 is provided, so as to be across both of the two regions. Thus, only a portion, which is located in the region where the cover film 130 is provided, of the crimping piece 220 arranged across both of the two regions is configured to penetrate the cover film 130. It is possible to restrain contact of the cover film 130 with the crimping piece 220 adjacent to the crimping piece 220 arranged across both of the two regions, the adjacent crimping piece 220 being arranged in the region where the conductor layer 120 is exposed, and thus the stability of the electrical connection can be increased.

Sixth Embodiment

Figure 11:
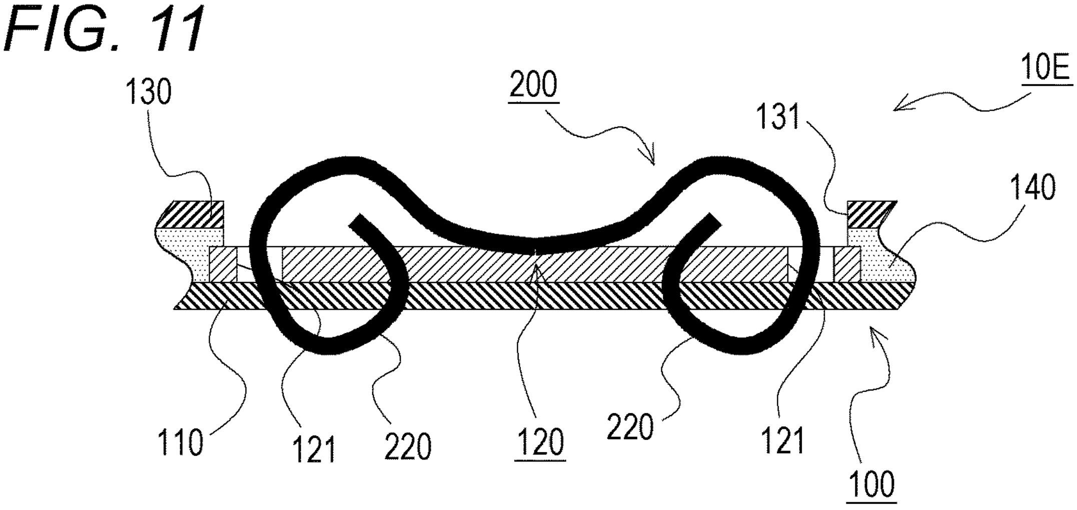
FIG. 11 is a schematic sectional view of the flexible printed circuit board with connection terminal according to a sixth embodiment of the present disclosure.

FIG. 11 illustrates a sixth embodiment of the present disclosure. In the fifth embodiment, the configuration has been described in which the connection terminal 200 is attached to the FPC 100 so that the crimping piece 220 penetrates the FPC 100 from the base film 110 side toward the conductor layer 120 side. On the other hand, in the present embodiment, a configuration will be described in which the connection terminal 200 is attached to the FPC 100 so that the crimping piece 220 penetrates the FPC 100 from the conductor layer 120 side toward the base film 110 side. Since the configuration of the FPC 100 itself is the same as that of the fifth embodiment and the configuration of the connection terminal 200 itself is the same as that of the first embodiment, the same components may be denoted by the same reference numerals and the description thereof may be omitted.

FIG. 11 is a schematic sectional view of the flexible printed circuit board with connection terminal according to the sixth embodiment of the present disclosure. FIG. 11 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10E with terminal") according to the present embodiment will be described. The FPC 10E with terminal includes the flexible printed circuit board (hereinafter referred to as "FPC 100") and the connection terminal 200 attached to the FPC 100. The configuration of the FPC 100 itself is as described in the fifth embodiment, and the configuration of the connection terminal 200 itself is as described in the first embodiment.

In the present embodiment, as in the fourth embodiment, the crimping piece 220 is configured to penetrate the through-hole 121 from the conductor layer 120 side toward the base film 110 side, and be bent in the direction opposite to the direction in which the crimping piece 220 penetrates the FPC 100, to bite into at least the part of the conductor layer 120. In the present embodiment, the connection terminal 200 is attached to the FPC 100 by configuring the crimping piece 220 in this way.

Even in the FPC 10E with terminal according to the present embodiment configured as described above, the same effect as that of the fifth embodiment can be obtained. Note that the procedure for crimping the connection terminal 200 to the FPC 100 is as described in the first embodiment.

Seventh Embodiment

Figure 12:
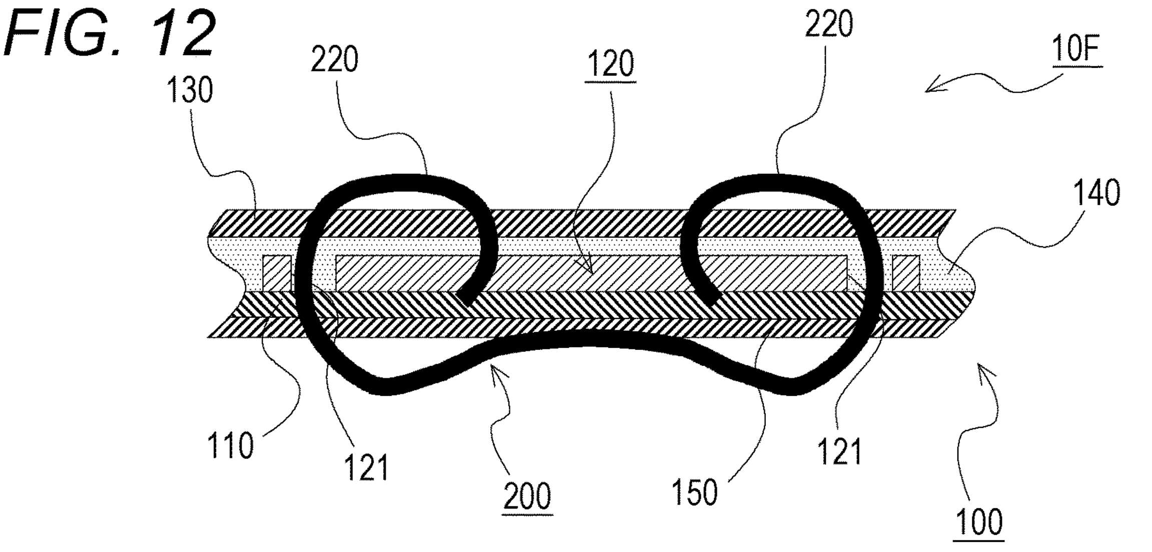
FIG. 12 is a schematic sectional view of the flexible printed circuit board with connection terminal according to a seventh embodiment of the present disclosure.

FIG. 12 illustrates a seventh embodiment of the present disclosure. In the present embodiment, an insulating reinforcing film 150 is further provided with respect to the configuration of the FPC 100 described in the first embodiment. In the present embodiment, a configuration will be described in which the insulating reinforcing film 150 is partially provided integrally with the base film 110 in a part of a region of the base film 110. Since the other basic configurations are the same as those in the first embodiment, the same components may be denoted by the same reference numerals and the description thereof may be omitted.

FIG. 12 is a schematic sectional view of the flexible printed circuit board with connection terminal according to the seventh embodiment of the present disclosure. FIG. 12 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10F with terminal") according to the present embodiment will be described. The FPC 10F with terminal includes the flexible printed circuit board (hereinafter referred to as "FPC 100") and the connection terminal 200 attached to the FPC 100. The configuration of the connection terminal 200 is as described in the first embodiment.

Similar to the first embodiment, the FPC 100 according to the present embodiment includes the base film 110, the conductor layer 120, the cover film 130, and the adhesive layer 140 for bonding the base film 110 and the cover film 130. Then, in the FPC 100 according to the present embodiment, the insulating reinforcing film 150 is provided integrally with the base film 110 in a predetermined region of the base film 110. More specifically, the insulating reinforcing film 150 is partially provided integrally with the base film 110 in a region on the bottom surface side of the base film 110 which the crimping pieces 220 penetrate. Here, the bottom surface side of the base film 110 is a surface on a side that is not in contact with the conductor layer 120. Note that a region where the insulating reinforcing film 150 is provided may be provided in a plurality of positions respectively corresponding to regions which the crimping pieces 220 penetrate, or may be provided in one position so as to include the entire region which the crimping pieces 220 penetrate.

The configurations of the base film 110 and the conductor layer 120 are as described in the first embodiment. That is, also in the present embodiment, the conductor layer 120 is removed in the region of the conductor layer 120 which the crimping pieces 220 penetrate.

In the present embodiment, the crimping piece 220 is configured to penetrate the through-hole 121 from the insulating reinforcing film 150 side toward the cover film 130 side, and be bent in the direction opposite to the direction in which the crimping piece 220 penetrates the FPC 100, to bite into at least the part of the conductor layer 120.

More specifically, the tip of the crimping piece 220 sequentially penetrates the insulating reinforcing film 150, the base film 110, the through-hole 121 provided in the conductor layer 120, and the cover film 130, and is then bent in the direction opposite to the direction in which the crimping piece 220 penetrates the FPC 100, to penetrate the cover film 130 again and then bite into at least the part of the conductor layer 120. In the present embodiment, the connection terminal 200 is attached to the FPC 100 by crimping the crimping piece 220 in this way.

The same effect as that of the first embodiment can also be obtained in the FPC 10F with terminal according to the present embodiment configured as described above. Further, in the present embodiment, rigidity of a portion where the insulating reinforcing film 150 is provided can be increased. Further, since the insulating reinforcing film 150 is partially provided, the increase in weight of the FPC 100 can be suppressed, and the flexibility of the FPC 100 is not reduced. Note the procedure for crimping the connection terminal 200 to the FPC 100 is as described in the first embodiment. Note that in the present embodiment, before the connection terminal 200 is crimped, the insulating reinforcing film 150 may be integrally provided with the base film 110 in a predetermined region of the base film 110 by various known methods such as adhesion.

Eighth Embodiment

Figure 13:
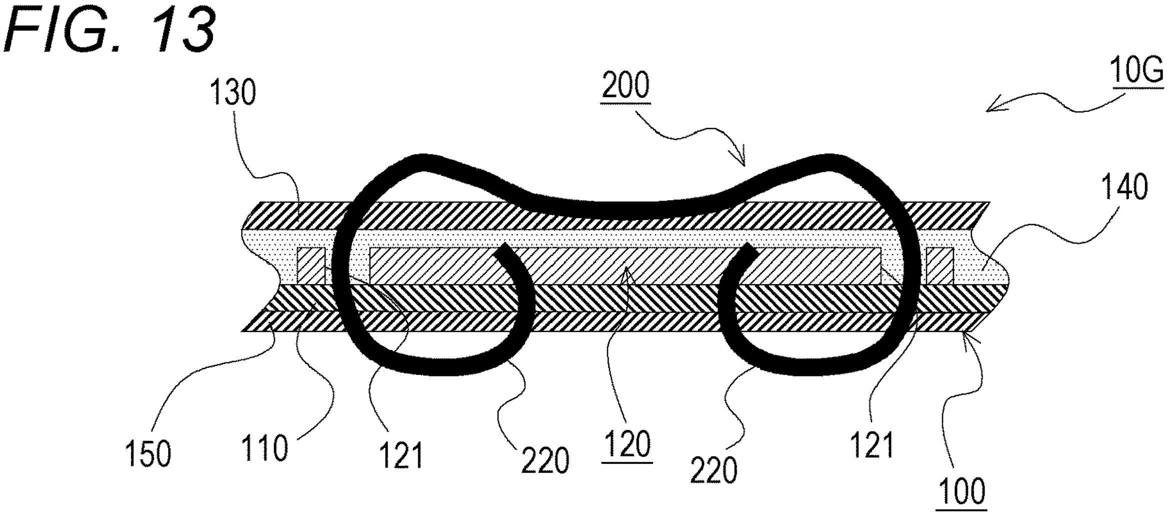
FIG. 13 is a schematic sectional view of the flexible printed circuit board with connection terminal according to an eighth embodiment of the present disclosure.

FIG. 13 illustrates an eighth embodiment of the present disclosure. In the seventh embodiment, the configuration has been described in which the connection terminal 200 is attached to the FPC 100 so that the crimping piece 220 penetrates the FPC 100 from the insulating reinforcing film 150 side toward the cover film 130 side. On the other hand, in the present embodiment, a configuration will be described in which the connection terminal 200 is attached to the FPC 100 so that the crimping piece 220 penetrates the FPC 100 from the cover film 130 side toward the insulating reinforcing film 150 side. Since the configuration of the FPC 100 itself is the same as that of the seventh embodiment and the configuration of the connection terminal 200 itself is the same as that of the first embodiment, the same components may be denoted by the same reference numerals and the description thereof may be omitted.

FIG. 13 is a schematic sectional view of the flexible printed circuit board provided with connection terminal according to the eighth embodiment of the present disclosure. FIG. 13 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10G with terminal") according to the present embodiment will be described. The FPC 10G with terminal includes the flexible printed circuit board (hereinafter referred to as "FPC 100") and the connection terminal 200 attached to the FPC 100. The configuration of the FPC 100 itself is as described in the seventh embodiment, and the configuration of the connection terminal 200 itself is as described in the first embodiment.

In the present embodiment, the crimping piece 220 is configured to penetrate the FPC 100 from the cover film 130 side toward the insulating reinforcing film 150 side, and be bent in the direction opposite to the direction in which the crimping piece 220 penetrates the FPC 100, to bite into at least the part of the conductor layer 120.

More specifically, the tip of the crimping piece 220 sequentially penetrates the cover film 130, the through-hole 121 provided in the conductor layer 120, the base film 110, and the insulating reinforcing film 150, and is then bent in the direction opposite to the direction in which the crimping piece 220 penetrates the FPC 100, to sequentially penetrate the insulating reinforcing film 150 and the base film 110 again and then bite into at least the part of the conductor layer 120. In the present embodiment, the connection terminal 200 is attached to the FPC 100 by crimping the crimping piece 220 in this way.

The same effect as that of the seventh embodiment can also be obtained in the FPC 10G with terminal according to the present embodiment configured as described above. Note that the procedure for crimping the connection terminal 200 to the FPC 100 is as described in the first embodiment. Note that in the present embodiment, before the connection terminal 200 is crimped, the insulating reinforcing film 150 may be integrally provided with the base film 110 in the predetermined region of the base film 110 by various known methods such as the adhesion.

Ninth Embodiment

Figure 14:
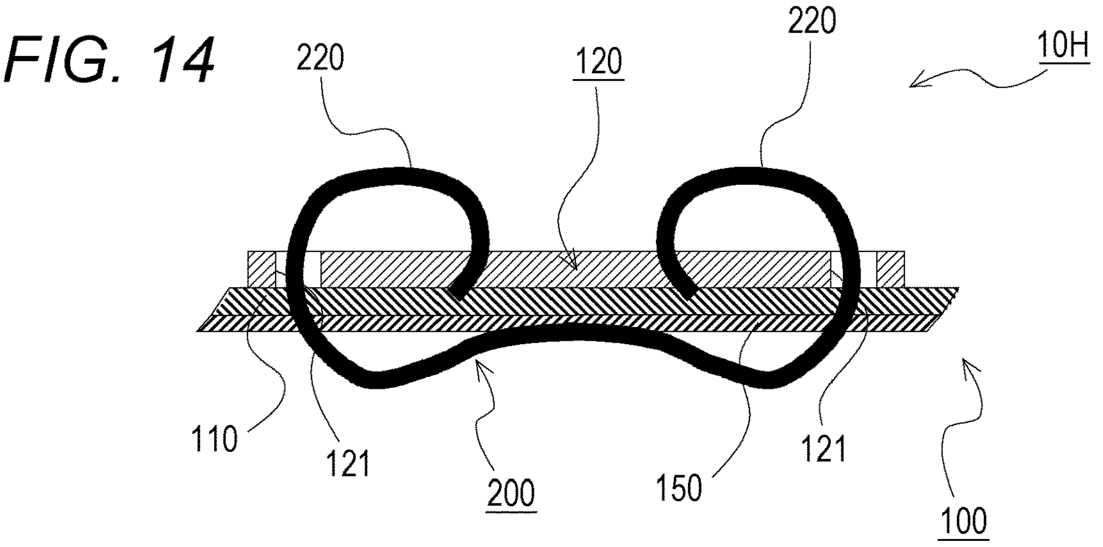
FIG. 14 is a schematic sectional view of the flexible printed circuit board with connection terminal according to a ninth embodiment of the present disclosure.

FIG. 14 illustrates a ninth embodiment of the present disclosure. In the present embodiment, a configuration will be described in which the insulating reinforcing film 150 is partially provided integrally with the base film 110 in a part of a region of the base film 110 with respect to the configuration of the FPC 100 described in the third embodiment. Since the other basic configurations are the same as those in the third embodiment, the same components may be denoted by the same reference numerals and the description thereof may be omitted.

FIG. 14 is a schematic sectional view of the flexible printed circuit board with connection terminal according to the ninth embodiment of the present disclosure. FIG. 14 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10H with terminal") according to the present embodiment will be described. The FPC 10H with terminal includes the flexible printed circuit board (hereinafter referred to as "FPC 100") and the connection terminal 200 attached to the FPC 100. The configuration of the connection terminal 200 is as described in the first embodiment.

The FPC 100 according to the present embodiment includes the base film 110 and the conductor layer 120, as in the third embodiment. Then, in the FPC 100 according to the present embodiment, the insulating reinforcing film 150 is provided integrally with the base film 110 in a predetermined region of the base film 110. More specifically, the insulating reinforcing film 150 is partially provided integrally with the base film 110 in the region on the bottom surface side of the base film 110 which the crimping pieces 220 penetrate. Note that the region where the insulating reinforcing film 150 is provided may be provided in the plurality of positions respectively corresponding to the regions which the crimping pieces 220 penetrate, or may be provided in one position so as to include the entire region which the crimping pieces 220 penetrate.

The configurations of the base film 110 and the conductor layer 120 are as described in the first embodiment. That is, also in the present embodiment, the conductor layer 120 is removed in the region of the conductor layer 120 which the crimping pieces 220 penetrate.

In the present embodiment, the crimping piece 220 is configured to penetrate the through-hole 121 from the insulating reinforcing film 150 side toward the conductor layer 120 side, and be bent in the direction opposite to the direction in which the crimping piece 220 penetrates the FPC 100, to bite into at least the part of the conductor layer 120.

More specifically, the tip of the crimping piece 220 sequentially penetrates the insulating reinforcing film 150, the base film 110, and the through-hole 121 provided in the conductor layer 120, and is then bent in the direction opposite to the direction in which the crimping piece 220 penetrates the FPC 100, to bite into at least the part of the conductor layer 120. In the present embodiment, the connection terminal 200 is attached to the FPC 100 by crimping the crimping piece 220 in this way.

The same effect as that of the third embodiment can also be obtained in the FPC 10H with terminal according to the present embodiment configured as described above. Further, in the present embodiment, the rigidity of the portion where the insulating reinforcing film 150 is provided can be increased. Further, since the insulating reinforcing film 150 is partially provided, the increase in weight of the FPC 100 can be suppressed, and the flexibility of the FPC 100 is not reduced. Note that the procedure for crimping the connection terminal 200 to the FPC 100 is as described in the first embodiment. Note that in the present embodiment, before the connection terminal 200 is crimped, the insulating reinforcing film 150 may be integrally provided with the base film 110 in the predetermined region of the base film 110 by various known methods such as the adhesion.

Note that in the configuration described in the fifth embodiment, similarly to the present embodiment, a configuration can also be employed in which the insulating reinforcing film 150 is partially provided integrally with the base film 110 in the region of the base film 110 which the crimping pieces 220 penetrate.

Tenth Embodiment

Figure 15:
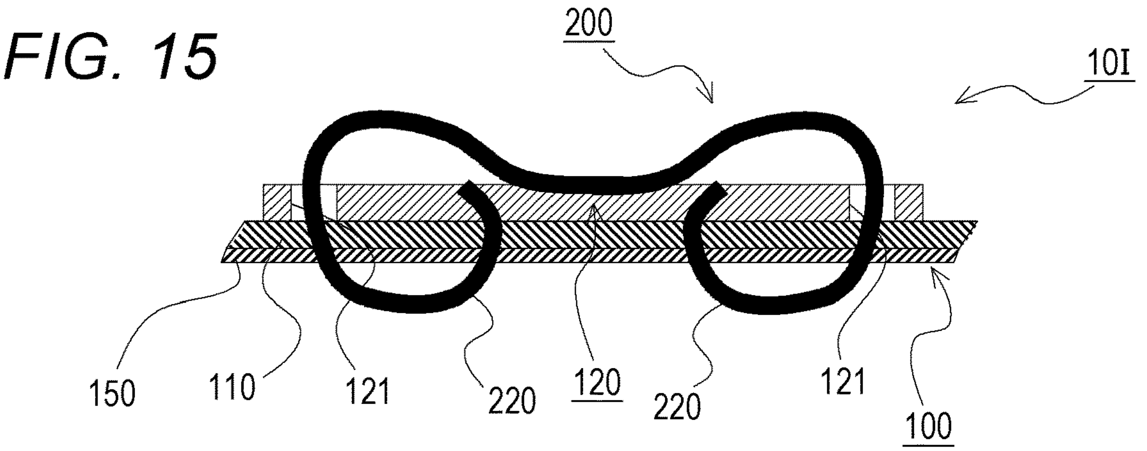
FIG. 15 is a schematic sectional view of the flexible printed circuit board with connection terminal according to a tenth embodiment of the present disclosure.

FIG. 15 illustrates a tenth embodiment of the present disclosure. In the ninth embodiment, the configuration has been described in which the connection terminal 200 is attached to the FPC 100 so that the crimping piece 220 penetrates the FPC 100 from the insulating reinforcing film 150 side to the conductor layer 120 side. On the other hand, in the present embodiment, a configuration will be described in which the connection terminal 200 is attached to the FPC 100 so that the crimping piece 220 penetrates the FPC 100 from the conductor layer 120 side to the insulating reinforcing film 150 side. Since the configuration of the FPC itself is the same as that of the ninth embodiment and the configuration of the connection terminal itself is the same as that of the first embodiment, the same components may be denoted by the same reference numerals and the description thereof may be omitted.

FIG. 15 is a schematic sectional view of the flexible printed circuit board with connection terminal according to the tenth embodiment of the present disclosure. FIG. 15 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10I with terminal") according to the present embodiment will be described. The FPC 10I with terminal includes the flexible printed circuit board (hereinafter referred to as "FPC 100") and the connection terminal 200 attached to the FPC 100. The configuration of the FPC 100 itself is as described in the ninth embodiment, and the configuration of the connection terminal 200 itself is as described in the first embodiment.

In the present embodiment, the crimping piece 220 is configured to penetrate the FPC 100 from the conductor layer 120 side toward the insulating reinforcing film 150 side, and be bent in the direction opposite to the direction in which the crimping piece 220 penetrates the FPC 100, to bite into at least the part of the conductor layer 120.

More specifically, the tip of the crimping piece 220 sequentially penetrates the through-hole 121 provided in the conductor layer 120, the base film 110, and the insulating reinforcing film 150, and is then bent in the direction opposite to the direction in which the crimping piece 220 penetrates the FPC 100, to sequentially penetrate the insulating reinforcing film 150 and the base film 110 again and then bite into at least the part of the conductor layer 120. In the present embodiment, the connection terminal 200 is attached to the FPC 100 by crimping the crimping piece 220 in this way.

The same effect as that of the ninth embodiment can also be obtained in the FPC 10I with terminal according to the present embodiment configured as described above. Note that the procedure for crimping the connection terminal 200 to the FPC 100 is as described in the first embodiment. Note that in the present embodiment, before the connection terminal 200 is crimped, the insulating reinforcing film 150 may be integrally provided with the base film 110 in the predetermined region of the base film 110 by various known methods such as the adhesion.

Note that in the configuration described in the sixth embodiment, similarly to the present embodiment, the configuration can also be employed in which the insulating reinforcing film 150 is partially provided integrally with the base film 110 in the region of the base film 110 which the crimping pieces 220 penetrate.

Eleventh Embodiment

Figure 16:
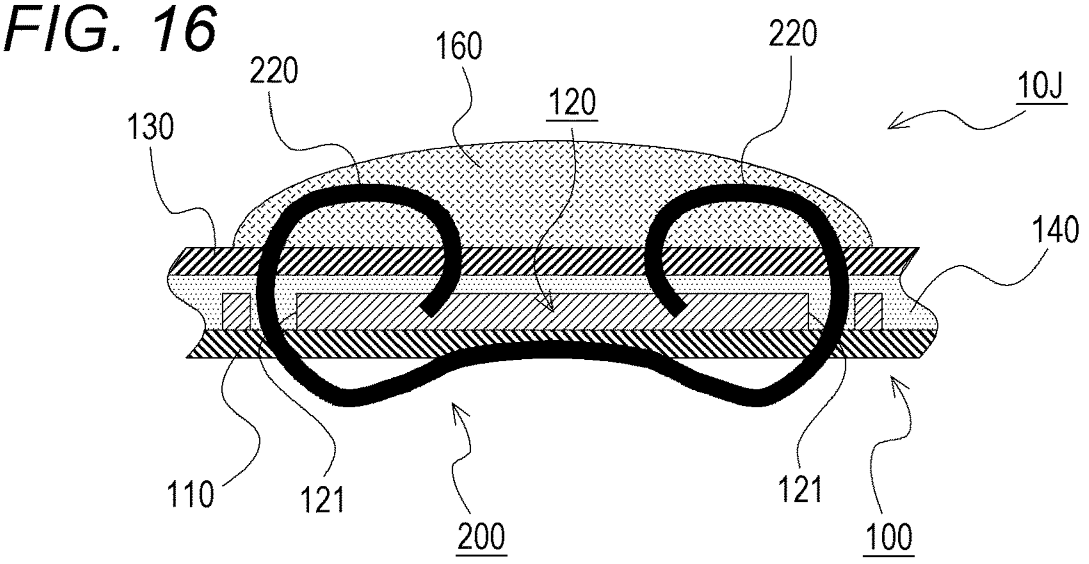
FIG. 16 is a schematic sectional view of the flexible printed circuit board with connection terminal according to an eleventh embodiment of the present disclosure.

FIG. 16 illustrates an eleventh embodiment of the present disclosure. In the present embodiment, a configuration will be described in which a portion of the crimping piece 220 protruding from the cover film 130 is covered with a resin material 160 with respect to the configuration of the FPC 100 described in the first embodiment. Since the other basic configurations are the same as those in the first embodiment, the same components may be denoted by the same reference numerals and the description thereof may be omitted.

FIG. 16 is a schematic sectional view of the flexible printed circuit board with connection terminal according to the eleventh embodiment of the present disclosure. FIG. 16 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10J with terminal") according to the present embodiment will be described. The FPC 10J with terminal includes the flexible printed circuit board (hereinafter referred to as "FPC 100") and the connection terminal 200 attached to the FPC 100. The configuration of the connection terminal 200 is as described in the first embodiment.

Similar to the first embodiment, the FPC 100 according to the present embodiment includes the base film 110, the conductor layer 120, the cover film 130, and the adhesive layer 140 for bonding the base film 110 and the cover film 130. Then, in the FPC 100 according to the present embodiment, the portion of the crimping piece 220 protruding from the cover film 130 and exposed from the FPC 100 is covered with the resin material 160.

The configurations of the base film 110 and the conductor layer 120 are as described in the first embodiment. That is, also in the present embodiment, the conductor layer 120 is removed in the region of the conductor layer 120 which the crimping pieces 220 penetrate.

In the present embodiment, as in the first embodiment, the crimping piece 220 is configured to penetrate the through-hole 121 from the base film 110 side toward the cover film 130 side, and be bent in the direction opposite to the direction in which the crimping piece 220 penetrates the FPC 100, to bite into at least the part of the conductor layer 120. In the present embodiment, the connection terminal 200 is attached to the FPC 100 by crimping the crimping piece 220 in this way.

The same effect as that of the first embodiment can also be obtained in the FPC 10J with terminal according to the present embodiment configured as described above. Further, in the present embodiment, it is possible to prevent dust and moisture on the portion of the crimping piece 220 protruding from the cover film 130, and also possible to suppress the physical impact and to increase the insulation properties. Note that the procedure for crimping the connection terminal 200 to the FPC 100 is as described in the first embodiment. Note that in the present embodiment, after the connection terminal 200 is crimped, the portion of the crimping piece 220 protruding from the cover film 130 and exposed from the FPC 100 can be covered with the resin material 160, for example, by applying and then curing a liquid resin material 160.

Note that in the present embodiment, the configuration has been described in which the resin material 160 is added to the configuration of the first embodiment, but configurations in which the resin material 160 described in the present embodiment is added to the configuration of the third, fifth, seventh, and ninth embodiments can also be employed.

Twelfth Embodiment

Figure 17:
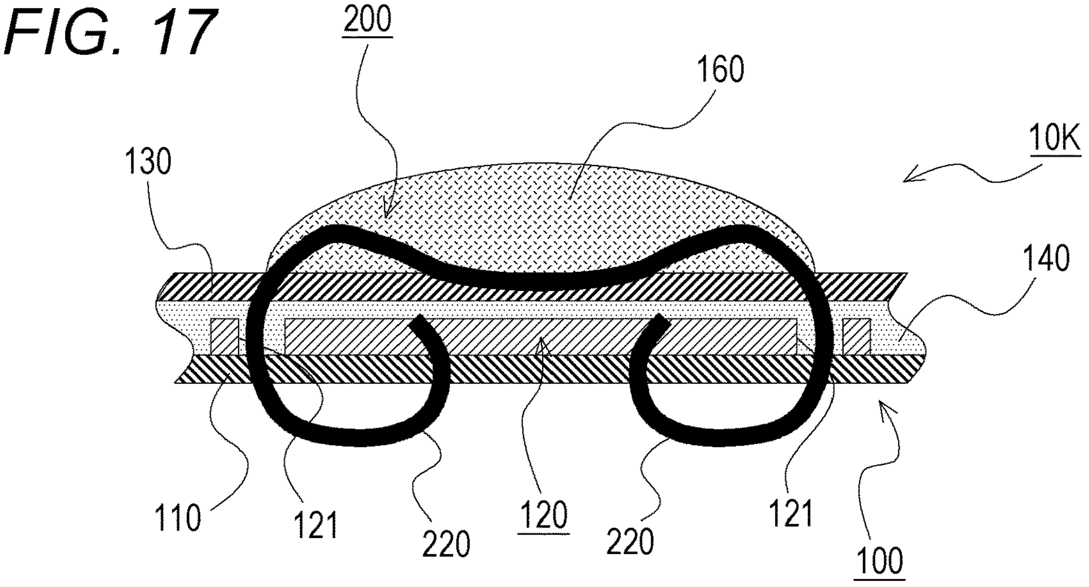
FIG. 17 is a schematic sectional view of the flexible printed circuit board with connection terminal according to a twelfth embodiment of the present disclosure.

FIG. 17 illustrates a twelfth embodiment of the present disclosure. In the eleventh embodiment, the configuration has been described in which the connection terminal 200 is attached to the FPC 100 so that the crimping piece 220 penetrates the FPC 100 from the base film 110 side to the cover film 130 side. On the other hand, in the present embodiment, a configuration will be described in which the connection terminal 200 is attached to the FPC 100 so that the crimping piece 220 penetrates the FPC 100 from the cover film 130 side to the base film 110 side. Since the configuration of the FPC itself is the same as that of the eleventh embodiment and the configuration of the connection terminal itself is the same as that of the first embodiment, the same components may be denoted by the same reference numerals and the description thereof may be omitted.

FIG. 17 is a schematic sectional view of the flexible printed circuit board with connection terminal according to the twelfth embodiment of the present disclosure. FIG. 17 simply illustrates a sectional view when the flexible printed circuit board with connection terminal is cut at the same position as the sectional view illustrated in FIG. 4 in the first embodiment.

The configuration of the flexible printed circuit board with connection terminal (hereinafter referred to as "FPC 10K with terminal") according to the present embodiment will be described. The FPC 10K with terminal includes the flexible printed circuit board (hereinafter referred to as "FPC 100") and the connection terminal 200 attached to the FPC 100. The configuration of the FPC 100 itself is as described in the eleventh embodiment, and the configuration of the connection terminal 200 itself is as described in the first embodiment.

In the present embodiment, as in the second embodiment, the crimping piece 220 is configured to penetrate the through-hole 121 from the cover film 130 side toward the base film 110 side, and be bent in the direction opposite to the direction in which the crimping piece 220 penetrates the FPC 100, to bite into at least the part of the conductor layer 120. In the present embodiment, the connection terminal 200 is attached to the FPC 100 by crimping the crimping piece 220 in this way.

The same effect as that of the eleventh embodiment can also be obtained in the FPC 10K with terminal according to the present embodiment configured as described above. Note that the procedure for crimping the connection terminal 200 to the FPC 100 is as described in the first embodiment. Note that in the present embodiment, after the connection terminal 200 is crimped, portions of the crimping pieces 220 protruding from the cover film 130 and exposed from the FPC 100 can be covered with the resin material 160, for example, by applying and then curing the liquid resin material 160.

Note that in the present embodiment, the configuration has been described in which the resin material 160 is added to the configuration of the second embodiment, but configurations in which the resin material 160 described in the present embodiment is added to the configuration of the fourth, sixth, eighth, and tenth embodiments can also be employed.

In each of the above embodiments, the configurations are employed in which the connection terminal 200 including the welding portion 210, which may also be called the welding plate or the welding crimp, has the plurality of crimping pieces 220, and the configuration has been described in which the conductor layer 120 is removed in the region of the conductor layer 120 of the FPC 100 which the crimping piece 220 penetrates. However, in the present disclosure, the configuration can be employed in which the connection terminal 200 is various connection terminals such as a male terminal or a female terminal, and includes the crimping pieces 220, and the configuration can also be employed in which the conductor layer 120 is removed in the region of the conductor layer 120 of the FPC 100 which the crimping piece 220 penetrates.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A flexible printed circuit board with connection terminal, the flexible printed circuit board comprising a base film and a conductor layer provided on the base film, wherein the connection terminal includes a plurality of crimping pieces for fixing the connection terminal to the flexible printed circuit board, the crimping pieces penetrate the flexible printed circuit board by being crimped, and are bent in a direction opposite to a direction in which the crimping pieces penetrate the flexible printed circuit board, to bite into at least a part of the conductor layer, and the conductor layer includes through holes in a region of the conductor layer which the crimping pieces penetrate.

2. The flexible printed circuit board with connection terminal according to claim 1, the flexible printed circuit board further comprising a cover film in a part of a region of the flexible printed circuit board, wherein the cover film is bonded to the base film so as to sandwich the conductor layer, and at least some of the crimping pieces bite into at least a part of the conductor layer without penetrating the cover film by being arranged in a region where the cover film is not provided of the flexible printed circuit board.

3. The flexible printed circuit board with connection terminal according to claim 2, wherein at least some of the crimping pieces are arranged in a region where the cover film is provided of the flexible printed circuit board, and penetrates the cover film to bite into at least the part of the conductor layer.

4. The flexible printed circuit board with connection terminal according to claim 3, wherein at least some of the crimping pieces are arranged across both the region where the cover film is provided and the region where the cover film is not provided of the flexible printed circuit board, and only a portion of the crimping piece located in the region where the cover film is provided penetrates the cover film.

5. The flexible printed circuit board with connection terminal according to claim 1, the flexible printed circuit board further comprising an insulating reinforcing film, wherein the insulating reinforcing film is partially provided integrally with the base film in a region of the base film which the crimping pieces penetrate.

6. The flexible printed circuit board with connection terminal according to claim 1, wherein in a state where the connection terminal is fixed to the flexible printed circuit board by the crimping pieces, at least a part of a portion exposed from the flexible printed circuit board of the crimping pieces is covered with a resin material.

7. The flexible printed circuit board with connection terminal according to claim 1, wherein the flexible printed circuit board is a single-sided copper-clad laminate in which the base film is made of polyimide, polyethylene naphthalate, or polyethylene terephthalate.

8. A method for manufacturing a flexible printed circuit board with connection terminal, the method comprising:

providing a conductor layer on a base film included in the flexible printed circuit board;

forming through holes in a predetermined regions of the conductor layer; and fixing the connection terminal to the flexible printed circuit board by crimping a crimping piece included in the connection terminal so as to penetrate the through holes in the predetermined regions of the conductor layer.

* * * * *